April 21, 1936.  G. H. CLARK ET AL  2,038,476

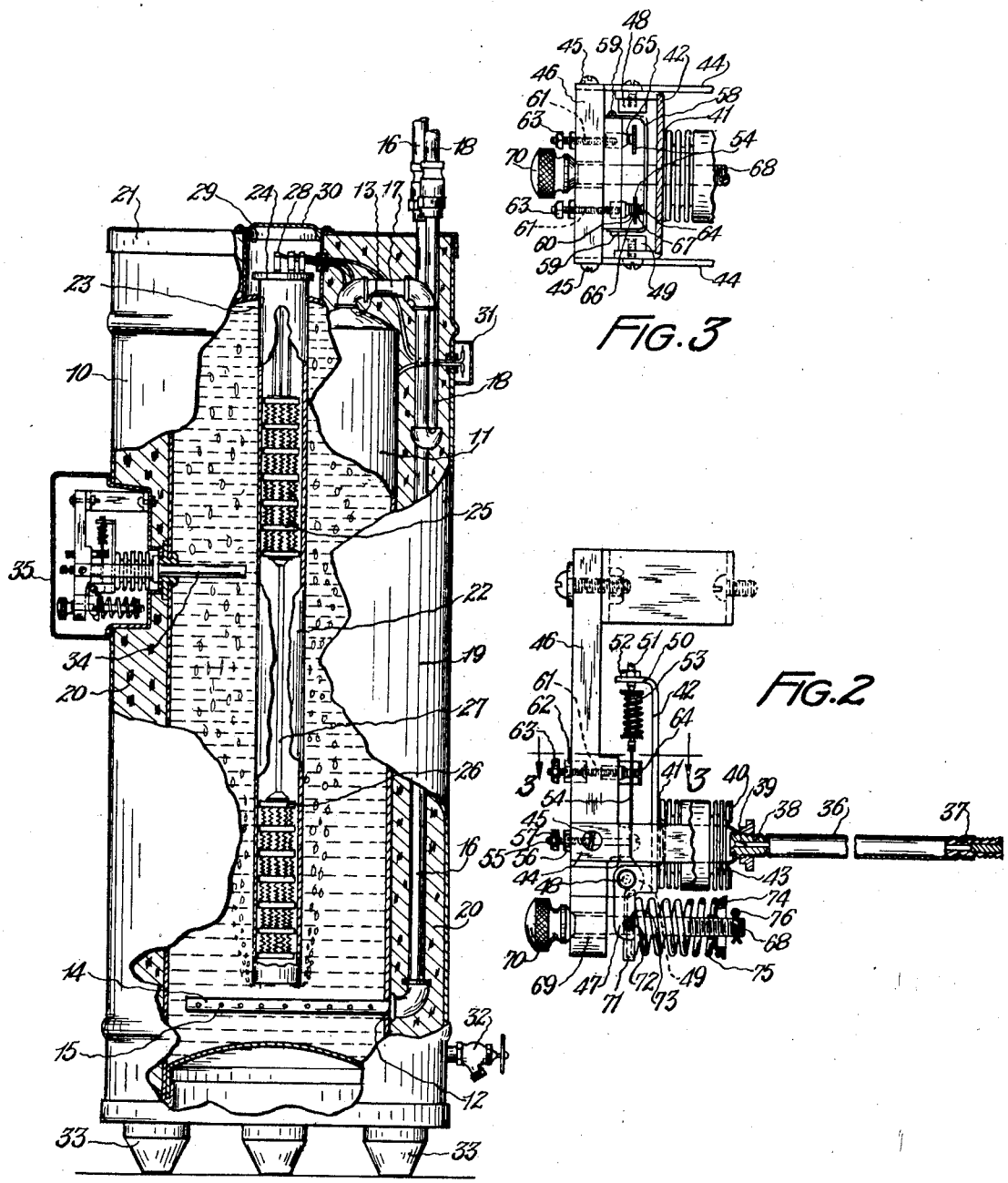

WATER HEATER

Filed July 29, 1932  2 Sheets-Sheet 2

INVENTORS:
GORDON H. CLARK
WARREN F. CLARK
ATTORNEYS

Patented Apr. 21, 1936

2,038,476

UNITED STATES PATENT OFFICE 2,038,476

WATER HEATER

Gordon H. Clark and Warren F. Clark, Pottstown, Pa., assignors to Automatic Electric Heater Company, Pottstown, Pa., a corporation of Delaware Application July 29, 1932, Serial No. 625,856

1 Claim. (Cl. 219—38)

This invention relates to water storage tanks of the electrically heated type for domestic use principally and has for one of its objects to provide a tank which is simple in construction, efficient in operation and inexpensive to manufacture.

A further object of the invention is to more efficiently and rapidly heat the water within the storage tank to a usable temperature by providing a multiple heating unit in which the energy or kilowatt input is applied first to one element of the unit and subsequently to the other element of the unit, no two units being in operation simultaneously.

A further object of the invention is to provide automatically actuated means for connecting the heating elements with the source of energy supply.

A further object of the invention resides in providing thermally actuated means for controlling the operation of the automatically actuated means as predetermined temperature conditions are attained within the tank.

With the objects above indicated and other objects hereinafter explained in view, the invention consists in the construction and combination of elements hereinafter described and claimed.

Referring to the drawings:

Figure 1 is a side elevational view of a water storage tank embodying the present invention with portions broken away to more clearly illustrate the construction;

Fig. 2 is a side elevational view on an enlarged scale of one type of thermostatically controlled switch;

Fig. 3 is a sectional view taken on line 3—3 of Fig. 2;

Figure 4:
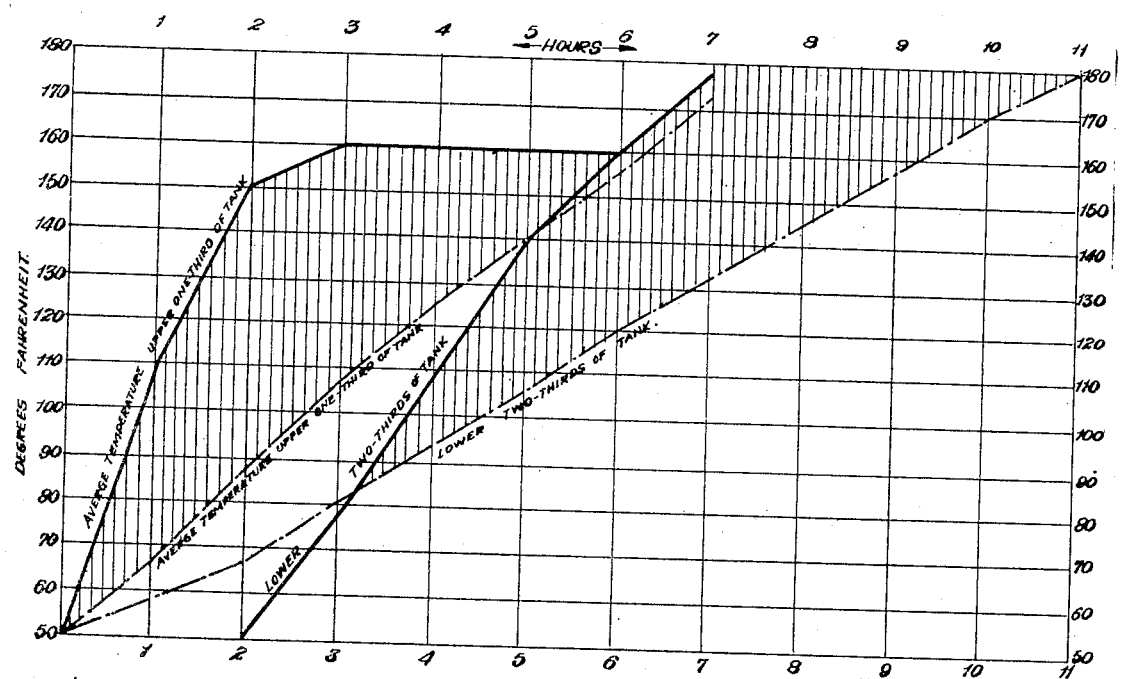
Fig. 4 is a graphic chart showing the comparison of the time required to heat identical bodies of water in accordance with the former method and the one embodying the present invention.

In the drawings 10 represents generally a water storage tank embodying the present invention and comprises in construction an inner water container 11 of any desired capacity depending upon the purpose for which it is to be used. The container 11 is metal elongated and located at its opposite ends, there being, however, a cold water inlet 12 adjacent the lower portion of the container and a hot water outlet 13 located in the top of the container 11. Extending through the inlet opening 12 and supported upon the side of the container 11 is a diffuser pipe 14 which extends transversely of the container and is provided with a plurality of spaced openings 15 through which the cold water is discharged into the container 11. A pipe 16 has its lower end connected to the diffuser pipe, while its upper end is adapted to communicate with any suitable source of cold water supply. A pipe 17 has one end connected with the hot water outlet opening 13, while its opposite end is connected to a U-shaped pipe 18 which normally extends below the outlet opening 13 to prevent the escape of hot water from the tank. The opposite end of the pipe 18 is adapted to be connected with the usual hot water system.

Surrounding the container 11 and spaced apart therefrom is a casing or housing 19 which is closed at the lower end, so as to enclose the lower end of the container 11, and open at its upper end. Suitable insulating material 20 is disposed within the space between the container 11 and the housing 19 to prevent the escapement of heat from the container 11 in which the heated water is stored. A cover 21 is secured to the open end of the housing 19 and suitable openings are provided therein to permit the pipes 16 and 18 to extend therethrough, connecting means being provided upon the outside of the cover so that the storage tank 10 may be installed without the necessity of removing any of the parts.

A hollow tube 22 has its lower end closed and extends axially of the container 11, the lower end being disposed adjacent the diffuser pipe 18, while the upper end is welded or otherwise secured within an opening 23 provided in the upper end of the container 11. The tube 22 normally receives therein a removable heating unit 24, which comprises, in the illustration shown in Fig. 1, a pair of heating elements 25 and 26 mechanically connected so as to be removable as a unit by a rod 27. The heating element 25 is normally disposed in the upper portion of the container 11, while the heating element 26 is normally disposed adjacent the lower portion of the container 11, the heating element 25 being adapted to heat approximately one-third of the water within the container 11, while the lower heating element is adapted to heat approximately two-thirds of the water within the container 11, as will be later more specifically described. The heating elements 25 and 26 are also electrically connected in a suitable circuit in the manner shown in Fig. 5 and have conductor wires connected to suitable terminals 28 carried by the cover of the unit 24. The cover 21 is further provided with an opening 29 directly above the removable unit 24 and is normally closed by a cover 30 removably secured to the cover 21 and over the opening 29. This cover is provided as a means for affording access to the removable heating unit 24 for repair in the event of damage and likewise for the replacement of a new unit, if necessary. An enclosure 31 is attached to the side of a storage tank 10 and normally serves as a junction box for electrically connecting the heating elements with the source of energy supply. At the lower portion of the storage tank 10 is a manually controlled discharge valve 32 communicating with the interior of the container 11 and through which the tank may be drained, if desired. Extensions or feet 33 are also provided upon the lower side of the storage tank 10 to suitably support the same.

A thermostat 34 is suitably mounted upon the side of the container 11 and extends within the latter where it is subjected to changes in temperature of the water within the container 11. The operating parts of the thermostat are more clearly shown in Figs. 2 and 3 and upon an enlarged scale so as to be more readily understood and will be described in detail presently. A suitable cover 35 is provided for enclosing the switch structure and is detachably connected with the storage tank 10, so that access may be had thereto in order to adjust the device to obtain operation thereof at any desired temperature.

Referring now to Figs. 2 and 3, it should be understood that a preferred construction of a thermostatically operated switch structure is illustrated, but there are many other types of devices which will function to produce the result desired in carrying out the intention of the invention. An elongated tube 36 is closed at one end by a plug 37 and at the opposite end is secured to a plug 38 which has an axially extending opening 39 extending therethrough. The outer end of the plug 38 is of reduced diameter and extends through an opening in a circular plate 40, the latter being rigidly secured by peening over the end of the plug 38. A cylindrical plate 41 is secured to an upright member 42 and in alignment with the plate 40, the said plates 40 and 41 having expansible and contractible bellows 43 secured thereto in a fluid-tight manner. As the tube 36 is filled with ether or any similar substance and communicates with the interior of the bellows 43 through the opening 39, any change in the volume of the substance, due to changes in temperature, will naturally cause an expansion or contraction of the bellows 43, which will result in a similar movement of the upright extension 42. The plate 40 and consequently the tube 36 is stationarily supported upon the rear ends of a pair of members 44, which have their forward ends secured by bolts 45 to the sides of a supporting member 46. The upright extension 42 has inwardly and downwardly extending arms 47, preferably formed integral at the lower portion thereof and are pivotally connected at 48 to lugs 49 formed integral upon the rear side of the supporting member 46.

The upper portion of the extension 42 is bent outwardly at 50 and is provided with a pair of interiorly screw threaded spaced openings to receive a pair of screw threaded studs 51, which may be located in adjusted position by nuts 52.

The under ends of the studs 51 are connected with the upper ends of coil springs 53, while the lower ends of the springs are connected with the upper ends of a pair of members 54. The lower ends of the members 54 are secured by bolts 55 which extend through suitable openings in the supporting member 46 and are secured by means of nuts 56. These bolts 55 also act as terminals for the electrical conductors for connecting the same in the circuit and are provided with nuts 57 by which the conductors may be secured.

A U-shaped strap 58 has its ends secured by bolts 59 to the sides of the supporting member 46, as more clearly shown in Fig. 3 and is preferably insulated therefrom. A pair of contacts 60 are insulated from the supporting member 46 and secured thereto by means of screw threaded members 61. Nuts 62 engage the extended ends of the screw threaded members 61 and securely hold the contacts in proper position, while nuts 63 are provided thereon for the purpose of connecting the conductors thereto. The U-shaped strap 58 has a contact 64 secured thereon and in longitudinal alignment with one of the contacts 60. The flexible members 54 are normally positioned adjacent the contacts and are provided with contact points 65, 66 and 67. The flexible members 54 are normally maintained under tension by the springs 53 and the contact points 65, 66 and 67 are moved into engagement with the contact points 60 and 64 by reason of the movement of the upright member 42 about the axis of the pivot 48.

Any suitable means may be employed for adjusting the upright member 42 so as to obtain the desired relation between the engaging contacts, but, in the present instance, a rod 68 extends through a suitable opening 69 in the lower portion of the supporting member 46 and has secured to its outer end a knob 70 by which the rod 68 may be rotated. A spring retainer 71 is provided with a pair of trunnions 72, which are disposed within recesses 73 provided in the depending portions of the arms 47, thereby preventing relative rotation of the spring retainer 71 with respect to the arms 47. The spring retainer 71 is provided with an axial opening through which the rod 68 extends. The opposite end of the rod 68 is exteriorly screw threaded and supports a spring retainer 74 which is provided with an interiorly screw threaded axial opening engageable with the screw threaded end of the rod 68. A coil spring 75 encircles the rod 68 and has its opposite ends secured respectively in the spring retainers 71 and 74. A cotter pin 76 extends through an opening in the end of the rod 68 to prevent accidental displacement of the spring retainer 74. It will be readily seen, therefore, that by rotating the knob 70 the tension of the spring 75 may be adjusted so as to vary the amount of expansion and contraction of the bellows 43 necessary to move the extension 42 about its pivot 48. This adjustment, of course, determines the degree of temperature at which the thermostat will operate the switch and suitable graduations may be provided upon the end of the knob 70 for the benefit of those adjusting the device.

The construction so far described embodies the preferred features of the water storage tank and in general is quite similar to the types of water storage tanks at present manufactured. The invention is more particularly directed to the method or manner in which the heating elements 25 and 26 are connected in the circuit and operated, and it is, therefore, desirable, in the present instance, to explain briefly the disadvantages of the types of water heaters at present available. The chart shown in Fig. 4 illustrates by comparison the time required to heat a body of water to a predetermined or usable temperature in the method employed in the commercial types of water heaters available and the method employing the present invention.

The electric water heater is an appliance which offers great load building possibilities to electric power supply companies. In order to give this appliance a wider acceptance it is essential that attractive rates be offered so as to place this service on a competitive cost basis with fuel fired heaters, such as gas, oil, coal, etc. To obtain a low energy rate the maximum demand of the water heater must be as low as possible and the load factor as high as possible. These conditions have a great bearing on the investment required to serve this load and hence the rate to be charged for the service. After years of experimenting with all sizes of water heaters most power companies have decided that a water heater should have a storage tank of approximately fifty gallons capacity and a heating unit of 1500 watts maximum demand. A large tank capacity and a low wattage heating unit demand means that the rate of heating is very slow and required a great many hours to raise the temperature of the water within the tank to a usable degree.

In making the comparison between the time required to raise the temperature of the same quantities of water to a usable degree, a two heating element unit was employed in both instances, the heating elements being positioned in a manner substantially as shown in Fig. 1. One of the heating elements, usually containing two-thirds of the heating capacity, was located near the top of the tank and was for heating the upper one-third of the tank. The other element was located near the bottom and usually contains one-third of the heating capacity and was for the purpose of heating the remaining two-thirds of the tank. These two elements are automatically controlled by thermostats, either two separate thermostats, or one thermostat with two switches. With this type of heater the water in the upper third of the tank is heated more rapidly than in the lower portion of the tank, thus reducing the time required to obtain usable hot water. However, the operation of these heating elements is simultaneous until the temperature of the water has been raised to a predetermined degree at which time the upper heating element is automatically cut out of operation and the lower heating element continues to operate to raise the temperature of the water to a still higher degree. When this degree of temperature has been attained, the lower heating element is cut out of operation and intermittently operates to raise the temperature of the added cold water as a like quantity of hot water is withdrawn from the tank. If more than two-thirds of the hot water is withdrawn from the tank, not only does the lower heating element operate, but the upper heating element is again brought into operation so as to assist in the raising of the temperature of the water. It should be understood, therefore, that at no time does the upper heating element operate independently of the lower heating element. In the chart the dot and dash lines represent the length of time required to raise the temperature of the water in the upper portion of the tank and in the lower portion of the tank in the types of water heaters commercially available. It is to be noted that the upper dot and dash line rises more rapidly than the lower dot and dash line, but at the same time there is merely a gradual rise in the temperature of the water for a period of approximately seven hours to a temperature of slightly over 170° Fahrenheit.

In the method of heating water in accordance with the present invention, the temperature of the entire body of water within the tank can be raised very rapidly, the rate of rise being designated by the solid black lines indicating the rise of temperature of water in the upper portion of the tank and the rise in temperature of the water in the lower portion of the tank.

Figure 5:
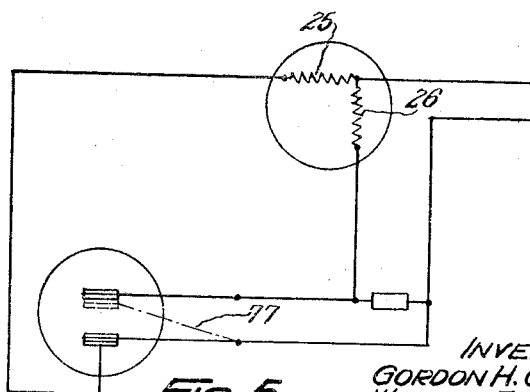
Fig. 5 is a wiring diagram of a multiple heating unit employed in the storage tank shown in Fig. 1.

Fig. 5 is a wiring diagram of the circuit employed in connection with the method of heating water in accordance with the present invention and includes a double throw switch 77 for alternately or successively operating the heating elements. At no time do the heating elements 25 and 26 operate in unison and consequently it is possible to apply the entire energy input to the heating elements. As a result the heating elements 25 and 26 are both of 1500 watt capacity, assuming that that is the maximum desired, so that there is no variation in the maximum heating capacity. The maximum energy is first applied to the upper heating element which heats the water in the upper one-third of the tank to a predetermined temperature. When that temperature is attained the upper heating element is automatically cut out of operation and the maximum energy is then applied to the lower heating element which has the same maximum heating capacity and heats the water in the lower two-thirds of the tank. When the water in the lower two-thirds of the tank is raised to a predetermined temperature, the lower heating element is automatically cut out of operation and remains so until hot water is withdrawn therefrom. As the withdrawn hot water is replaced by the admission of cold water into the tank, the temperature of the water necessarily drops and the lower heating element is then brought into operation to again raise the temperature of the water. If the withdrawn hot water is in excess of two-thirds of the capacity of the tank the lower heating element is automatically cut out and the upper heating element is automatically brought into operation. The upper heating element remains in operation until the temperature of the water has again been raised to a predetermined degree, at which time it is cut out of operation and the lower heating element brought into operation to complete the cycle of operation, as already explained.

By employing, therefore, heating elements of the maximum heating capacities and applying thereto the maximum energy input, the temperature of the water within the tank is raised to a usable degree in a very short period of time as compared with the commercial types at present available.

While two heating elements have been illustrated and described, it is to be understood that three or more may be employed in which event the cycle of operation is that the heating element at the top is operated to raise the temperature of the water to a predetermined degree. The upper heating element is then automaticaly cut out of operation and the center heating element brought into operation until the temperature of the water is raised to a higher degree.

When this temperature is attained the center heating element is cut out of operation and the lowermost heating element brought into operation to raise the temperature of the water within the container to a higher predetermined degree. All of the heating elements are then cut out of operation and, if hot water is withdrawn from the tank and cold water admitted to replace the same, the lower heating element is brought into operation. If more than one-third of the hot water is withdrawn the center heating element is turned on at the same time automatically cutting out the operation of the lower element. If more than two-thirds of the hot water is withdrawn, the top heating element is brought into operation at the same time the center heating element is cut out of operation. It will be noted that at no time during the operation are more than one of the heating elements operating at a time.

Figures 6, 7, 8:
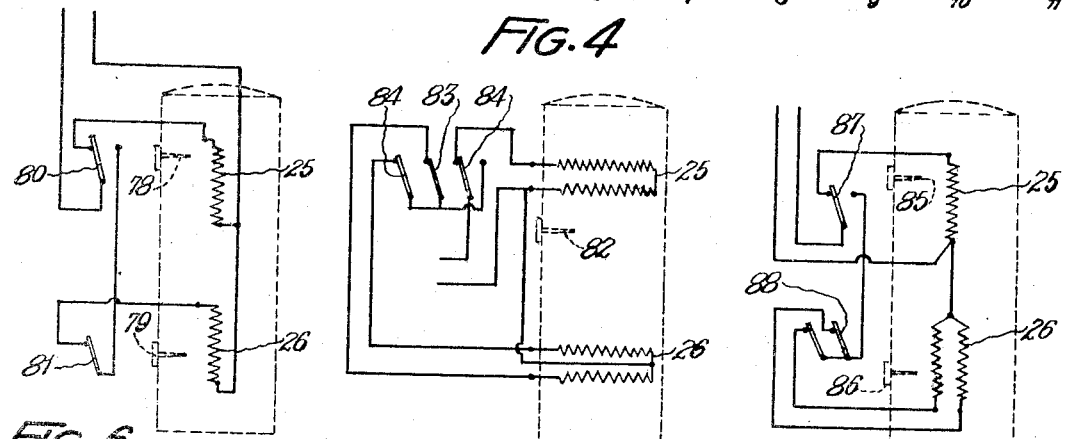
Figs. 6 to 9, inclusive, show wiring diagrams of modified arrangements of the heating units and their controls all embodying the present invention.
Figure 9:
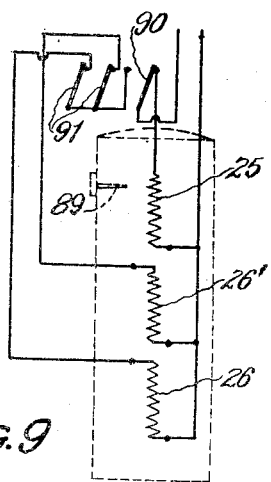

There are a number of ways of obtaining the result contemplated by the invention with various arrangements, such as shown diagrammatically in the wiring diagrams in Figs. 6 to 9, inclusive. Fig. 6 shows a tank with two heating elements 25 and 26 and two thermostats 78 and 79. The upper thermostat 78 is operatively connected with a double throw switch 80 and when the upper one-third of the tank is heated 30 automatically turns off the upper heating element 25 and turns on the lower heating element 26. When the entire contents of the tank is heated to a predetermined degree, the lower thermostat 79 is operatively connected with the switch 81 and cuts out the lower heating element 26. In Fig. 7 a tank with two heating elements 25 and 26 and one thermostat 82 is illustrated. The thermostat 82 is operatively connected with a double throw switch 83 and two on and off switches 84. The lower heating element 26 in this case is divided into two circuits. When the water in the upper one-third of the tank is heated to a predetermined degree, the thermostat 82 trips the double throw switch 83 turning off the upper heating element 25 and turning on the lower heating element 26. The two on and off switches 84 control the circuits of the lower heating element 26. In Fig. 8 a tank with two heating elements 25 and 26 and two thermostats 85 and 86 is shown. The upper heating element 25 is controlled by the upper thermostat 85 which is operatively connected with a double throw switch 87 to cut the upper heating element 25 out of operation when a predetermined temperature has been attained and to bring the lower heating element 26 into operation. The lower heating element 26 is divided into two circuits each controlled by a separate switch 88 operatively connected with a lower thermostat 86. Fig. 9 shows a tank with three heating elements 25, 26' and 26 and a single thermostat 89. The thermostat 89 has one double throw switch 90 and two on and off switches 91. In operation the upper heating element 25 raises the temperature of the water to a predetermined degree at which time the heating element 25 is cut out of operation and the central heating element 26' brought into operation. When the temperature is raised to a still further degree the center heating element 26' is cut out of operation and the lower heating element 26 is brought into operation until a higher predetermined temperature is attained. While in this illustration a single double throw operation is shown for the top heating element, a plurality of double throw operations may be employed. For instance, the thermostat can have two double throw switches whereby the full heating capacity is used first for the top element, second for the center element and third for the bottom element.

With this method of heating water it is possible to obtain far greater speed in raising the temperature of the water to a usable degree, while still operating within the maximum limit of a 1500 watt load. Irrespective of the maximum limit, however, the principle of heating will be the same.

While we have described the preferred embodiment of the invention, it is to be understood that we are not to be limited thereto, inasmuch as changes and modifications may be resorted to without departing from the spirit of the invention as defined by the appended claim.

Having thus described our invention, we claim:

A water heater comprising a receptacle for the water having an inlet and an outlet, a heating unit for heating the water in said receptacle including a plurality of superimposed longitudinally spaced and aligned heating elements adapted to heat different portions of the receptacle and mechanically interconnected by a rod, a circuit adapted to supply energy to said elements, means in said circuit for connecting the uppermost element with a source of energy supply, means in said circuit for disconnecting the uppermost element from the source of energy supply and connecting the succeeding element with the source of energy supply, and thermostatic means operatively connected with said connecting and disconnecting means for actuating the latter.

GORDON H. CLARK.
WARREN F. CLARK.